UNITED STATES PATENT OFFICE.

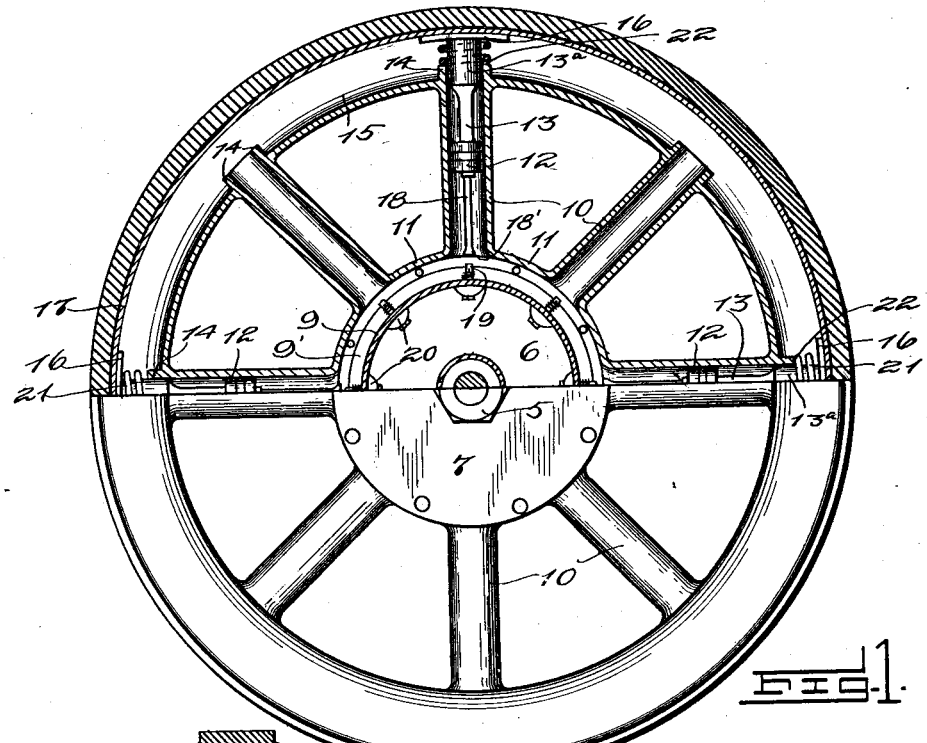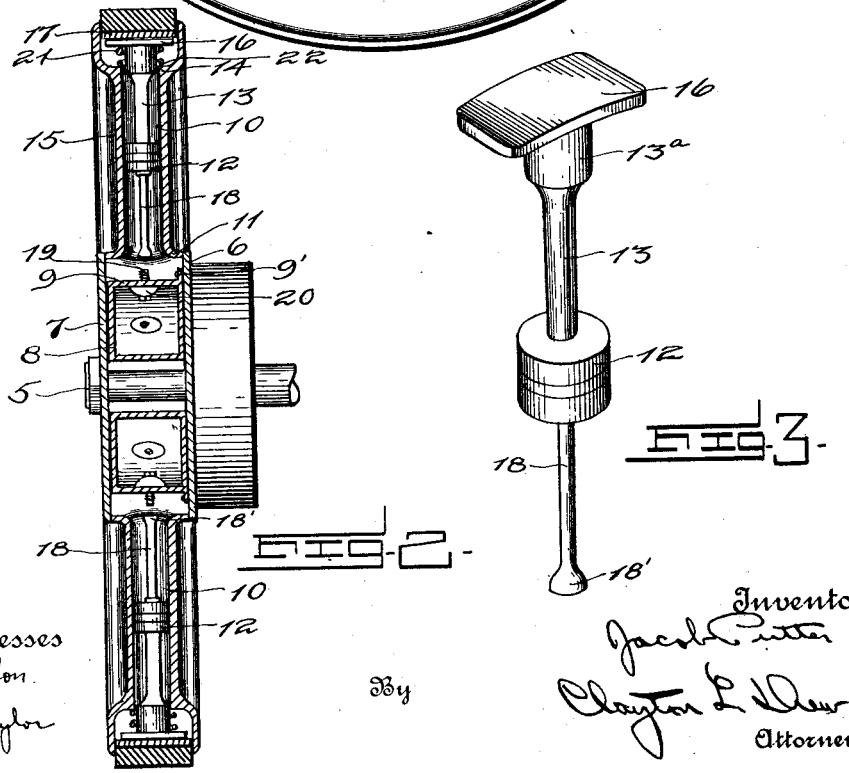

JACOB PUTTER, OF ST. JOSEPH, MISSOURI.

WHEEL.

1,100,027. Specification of Letters Patent. Patented June 16, 1914.

Application filed August 5, 1913. Serial No. 783,167.

*To all whom it may concern:*

Be it known that I, JACOB PUTTER, a citizen of the United States, residing at St. Joseph, in the county of Buchanan and State of Missouri, have invented certain new and useful Improvements in Wheels, of which the following is a specification.

This invention relates to improvements in vehicle wheels, and especially wheels for use on motor cars or automobiles, and its leading object is to provide a wheel having improved means for pneumatically sustaining the load placed thereon and for resisting the jars and shocks due to travel.

Another object of the invention is the provision of a vehicle wheel with a central chamber located near or around the hub and charged with compressed air under high pressure, hollow spokes connected with said chamber, pistons operating in said hollow spokes, a tread member bearing against the outer ends of the pistons, and valves adapted to be actuated by the pistons when the pressure of air in the hollow spokes falls below normal, whereby air from the compressed air chamber or reservoir will be released to restore the pressure in the spokes to normal.

With the above and other objects in view the invention embraces certain combinations, arrangements and constructions of parts and elements, clearly described in the following specification and clearly illustrated in the accompanying drawings, in which:—

Figure 1 is a side elevation of the improved vehicle wheel, with parts broken away to show the arrangement of a few of the pistons and the construction of the chamber for storing compressed air under high pressure. Fig. 2 is a sectional view taken on line 2—2 of Fig. 1. Fig. 3 is a perspective view of one of the spoke pistons.

Referring to the accompanying drawings illustrating the preferred embodiment of the invention, 5 designates the hub of the wheel, and 6 and 7 the side plates. Between the plates 6 and 7 is an annular chamber 8, in which air is stored. The inner edge portions of the plates 6 and 7 are connected in any suitable manner to the hub 5. The chamber 8 has an end wall 9 and flanges 9', which flanges are secured to the plates 6 and 7.

A series of hollow spokes 10 radiate from the plates 6 and 7, the inner ends of said plates being held spaced apart from each other by means of the curved portions 11, which serve to cover the annular member or ring 9. In each hollow spoke a piston 12 operates, each piston having a rod 13 which extends through the outer end of the spoke and is provided with an enlargement $13^a$ which snugly fits in the bearing 14, formed on the metal felly 15. The enlargement $13^a$ carries a curved end plate 16, which frictionally engages the metal tread member 17, to which is attached the rubber tread. A stem 18 extends from the inner end of each piston, to which it is connected, and said stem carries a knob or enlargement 18' on its end, which is adapted to engage the outer end of the valve stem 19, of the air valve 20, which is located on the bridge wall of said annular member or ring 9, and is adapted to release air from the chamber 8 when the inner end of the stem 18 actuates the valve stem 19 to unseat the valve thereof.

Helical expansion springs 21 are located around the outer end of the piston rods 13, the inner ends of said springs bearing against the seats 22 and the outer ends of the springs bearing against the end plates 16, so as to exert tension on the piston rods against the tread members.

The chamber 8 is charged with air under compression, with pressure of from three hundred to four hundred pounds. As the wheel passes over the road the piston rods will be forced inwardly against the tension of the springs 21 and the compressed air in the inner ends of the hollow spokes. The pressure of the air in said spokes is adapted to hold the end plates 16 forcibly against the inner tread member, which inner tread member is unattached to said end plates, whereby a slight relative movement between the inner tread member and the end plates of the piston rods is permitted, which tends to prevent skidding. When the air in any of the hollow spokes falls below the normal pressure the stem 18 will engage the valve stem, unseat the valve and release air from the compressed air reservoir 8, thereby restoring the pressure of the air in the hollow spoke to normal.

From the foregoing it will be seen that my improved vehicle wheel provides means whereby the usual pneumatic tire may be dispensed with, and the pneumatic action which the tire gives to the wheel is obtained in a manner that does not expose the wheel to the serious breakdowns due to punctures and blow outs.

Having described my invention I desire to secure by Letters Patent:—

1. A vehicle wheel having a hub, a series of spokes radiating from the hub and having air chambers in their inner ends, pistons having rods slidable in the spokes, said air chambers being filled with air under pressure adapted to hold the pistons outwardly in said spokes, a felly mounted on the spokes, a tread member bearing against the outer ends of the piston rods and unattached thereto, and an air reservoir around the hub, and valves engageable by the pistons for restoring the pressure of air in the spoke air chambers to normal when said pressure drops below normal.

2. A vehicle wheel comprising a hub, an air chamber surrounding said hub, spokes radiating from the air chamber and having air chambers in their inner ends, pistons slidable in the spokes, stems on the inner ends of said pistons extending into the spoke air chambers, rods on the outer ends of the pistons extending through the outer ends of the spokes, said spoke air chambers being charged with air under pressure, a tread member located against the outer ends of the piston rods, a felly on the ends of the spoke and partly receiving the tread member, and valves located on said first air chamber and adapted to be engaged by the piston stems.

3. In combination, a wheel hub having an air reservoir surrounding the same, a spoke chamber radiating from the hub, pistons movable in the spokes and having inwardly projecting stems, valves on the air reservoir for admitting air into the spoke chambers, said valves being engageable by the stems to admit air in said spoke chambers, and a tread on the piston.

In testimony whereof I affix my signature in presence of two witnesses.

JACOB PUTTER.

Witnesses:
LOTTIE J. JORDAN,
F. G. PUTTER.

---

Copies of this patent may be obtained for five cents each, by addressing the "Commissioner of Patents, Washington, D. C."